United States Patent [19]

Mase et al.

[11] 4,203,949
[45] May 20, 1980

[54] CATALYST CONVERTER FOR CLEANING EXHAUSTS OF CARS

[75] Inventors: Yoshio Mase; Tadayoshi Hayashi, both of Niiza; Shinichi Natsuume, Higashi-Kurume; Yasuhisa Kobayashi, Wako; Yoshiyuki Moriya, Kami-Fukuoka, all of Japan

[73] Assignee: Honda Giken Kogyo Kabushiki Kaisha, Tokyo, Japan

[21] Appl. No.: 937,511

[22] Filed: Aug. 28, 1978

Related U.S. Application Data

[63] Continuation of Ser. No. 789,012, Apr. 20, 1977, abandoned.

[30] Foreign Application Priority Data

Apr. 23, 1976 [JP] Japan .................................. 51-51013

[51] Int. Cl.$^2$ ........................... B01J 35/04; F01N 3/15
[52] U.S. Cl. ................... 422/179; 29/157 R; 422/180
[58] Field of Search ............... 422/171, 177, 179, 180; 29/157 R; 60/299, 301

[56] References Cited

U.S. PATENT DOCUMENTS

| | | | |
|---|---|---|---|
| 3,149,925 | 9/1964 | Scheitlin | 422/176 |
| 3,276,202 | 10/1966 | Gary | 422/174 |
| 3,854,888 | 12/1974 | Frietzsche et al. | 422/180 |
| 3,920,404 | 11/1975 | Gandhi et al. | 422/180 |
| 3,948,611 | 4/1976 | Stawsky | 422/180 |
| 3,978,567 | 9/1976 | Vroman | 29/157 R |
| 3,990,859 | 11/1976 | Waite | 422/180 |
| 4,093,423 | 6/1978 | Neumann | 60/299 X |

FOREIGN PATENT DOCUMENTS

| | | | |
|---|---|---|---|
| 2245535 | 4/1974 | Fed. Rep. of Germany | 422/179 |
| 2261663 | 6/1974 | Fed. Rep. of Germany | 422/180 |
| 2363013 | 7/1974 | Fed. Rep. of Germany | 422/180 |
| 2417554 | 10/1974 | Fed. Rep. of Germany | 422/180 |
| 1368509 | 9/1974 | United Kingdom | 422/180 |

*Primary Examiner*—Michael S. Marcus
*Attorney, Agent, or Firm*—Irving M. Weiner; Pamela S. Burt; Melvin Yedlin

[57] ABSTRACT

A catalyst converter for cleaning the exhaust of a vehicle, and in particular for a vehicle such as a car or motorcycle. The catalyst converter is provided with a case containing and holding a honeycomb-shaped ceramic catalyst body, with the case being divided into two halves in the axial direction. The catalyst body is covered in the front and rear with members supporting the end edges in the axial direction and the outer peripheral portions. The halves of the case are integrally combined while being pressed toward each other.

8 Claims, 8 Drawing Figures

CATALYST CONVERTER FOR CLEANING EXHAUSTS OF CARS

This is a continuation of application Ser. No. 789,012, filed Apr. 20, 1977 now abandoned.

The present invention relates to a catalyst converter adapted to clean the exhaust of a vehicle, and particularly for cleaning the exhaust of a vehicle such as a motorcycle.

More particularly, the present invention relates to a catalyst converter wherein a case containing and holding a catalyst body is formed, with the case being divided into two halves in the axial direction. The catalyst body is covered in the front and rear with members supporting the respective end edges in the axial direction and the outer peripheral portions, i.e., the radial portions of the edges, and is fitted in the front and rear with the respective halves of the above-mentioned case. The case halves are integrally combined with each other at the joining ends while pressing the catalyst body in the axial direction.

BACKGROUND OF THE INVENTION

Catalyst converters are used as apparatus for cleaning exhaust gases of internal combustion engines of cars. Such a catalyst converter is provided in the passage of an exhaust pipe so as to remove carbon monoxide, hydrocarbon, and other noxious components in the exhaust, and to clean the exhaust.

In such a catalyst converter, a catalyst carrier is formed of ceramics to be in the form of a honeycomb such as of a columnar block and has a catalyst metal deposited on it to form a catalyst body. Such catalyst body made of ceramics is contained and held in an exhaust pipe or a case connected with it so that exhausts may pass through the catalyst body and may contact the catalyst metal to remove the above-mentioned components.

In the above-described catalyst converter, the catalyst carrier is shaped of ceramics and is therefore so fragile that it is likely to be cracked or broken by vibrations and shocks. Therefore, the life of the catalyst is substantially shortened due to the above-mentioned cracking and breaking. Thus, there is a problem with respect to the durability of the catalyst converter as above described.

Particularly, a motorcycle is required to have sportiness characteristics differing from those of an automobile, and therefore shock absorbers are provided taking such sportiness characteristics into consideration and as a result the motorcycle will be subjected to more vibrations and large shocks. In case the above-described type of catalyst converter is employed on the motorcycle, such vibrations and shocks will act on the catalyst converter to crack or break the catalyst body. In order to prevent such cracking or breaking, the holding of the catalyst body must be taken into consideration.

In the case of actually holding the catalyst body, such holding is generally provided by a case in the exhaust system. Because the case is made of a steel plate but the catalyst body is made of ceramics, the following problem will occur in holding the catalyst body in the case.

Because the catalyst body is fitted in the case while cold and is assembled while cold, and because the parts become heated when the exhaust is to be cleaned, the difference in the thermal expansion between them will cause a clearance to be made between the case and catalyst body and, by the vibrations or the like of the vehicle, the catalyst body in the case will be staggered and as a result will be cracked or broken as mentioned above. Therefore, it has been suggested to provide a corrugated elastic plate in the case so as to hold the catalyst body. However, in this case the catalyst body will not be held well while hot in the axial direction, will slide in the axial direction in the case, will collide on the end surfaces with the front and rear of the case, and will be cracked or broken as mentioned above. Therefore, it has been considered to support the catalyst body by separately providing elastic supporting members in the radial direction and axial direction. However, in this case the number of component parts will increase, the structure will be complicated, and the ease of assembly will be decreased. Thus, it is not desirable to mass-production and cost-reduction to employ this type of converter. Further, the sealability between the case and catalyst body will be reduced and untreated and uncleaned exhaust will be likely to be discharged through the clearance between the catalyst body and case. Thus, it is not desirable to the exhaust cleaning treatment.

SUMMARY OF THE INVENTION

The present invention provides a catalyst converter for cleaning the exhaust of a vehicle. The catalyst converter includes tubular parts connected with an exhaust passage, a pair of symmetrical tubular divided case halves having a diameter larger than of the tubular parts and opened at their end edges, and a honeycomb-shaped catalyst body made of at least one ceramic and fitted within the case formed by the case halves. A pair of elastic supporting rings made of compressed moldings of metal fibers or the like are in contact with the portions in the axial direction and in the peripheral direction of the front and rear end edge portions of the catalyst body. The elastic supporting rings are inserted into the case halves, and the case halves are integrally combined with each other in butted joining parts while being pressed toward each other in the axial direction from both ends in the axial direction of the catalyst body.

An object of the present invention is to provide a catalyst converter wherein a case containing and holding a catalyst body is formed as divided into two halves in the axial direction, the catalyst body is inserted between the halves of the case, both halves are joined with each other while being pressed in the axial direction so as to be integrally combined at the joined ends, and elastic supporting members supporting the catalyst body in the axial direction and radial direction are interposed between the halves of the case and the front and rear of the catalyst body.

A further object of the present invention is to provide a catalyst converter in which, because cylindrical halves of a case are integrally joined, the number of component parts of the case is low, the assembly of the case and catalyst body is simplified, and manufacture and mass-production is favorable with costs being reduced.

Another object of the present invention is to provide a catalyst converter wherein, as elastic bodies supporting a catalyst body in the end parts in the axial direction and radial direction are interposed between a case and the catalyst body, and halves of the case are integrally joined while being pressed in the axial direction, the catalyst body will be elastically supported within the case. Also, the difference in thermal expansion (due to temperature variations) between the case and the catalyst body made of ceramics will be absorbed and the catalyst body will be held effectively and positively. In addition, a catalyst converter is provided which is thereby high in resistance to vibrations and shocks, long in life, and high in durability.

An object of the present invention is to provide a catalyst converter wherein, in order to effectively and positively hold a catalyst body within a case, elastic supporting metal rings of an L-shaped cross-section formed of compressed moldings of metal fibers are applied respectively to cover both end surfaces in the axial direction of the catalyst body, and divided case halves are pressed in to be integral while applying a load in the axial direction so that the catalyst body may be supported within the case with a pre-load applied while thereby compressing the supporting rings.

Thus, there is provided a catalyst converter wherein a catalyst body is held effectively and positively even under such varying conditions as hot and cold temperature variations, and the catalyst body made of fragile ceramics is protected and life and durability are high.

Further, the present invention provides a catalyst converter wherein a catalyst body is supported effectively and properly within a case while applying a pre-load of 15 to 75 kg/cm$^2$ in the axial direction to the end edge portions of the above-mentioned supporting rings.

Some preferred embodiments of the present invention shall be detailed in the following with reference to the accompanying drawings.

DETAILED DESCRIPTION

Figure 1:
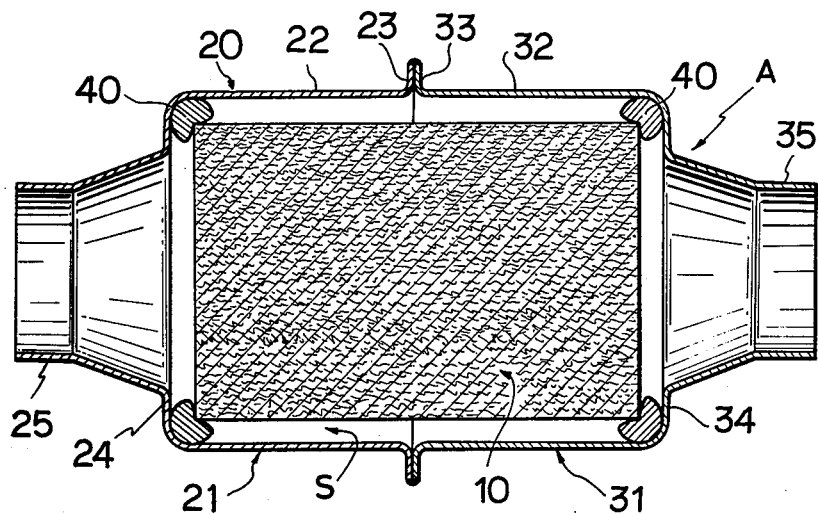
FIG. 1 is a vertically-sectioned side view of a catalyst converter according to a first embodiment of the present invention.
Figure 2:
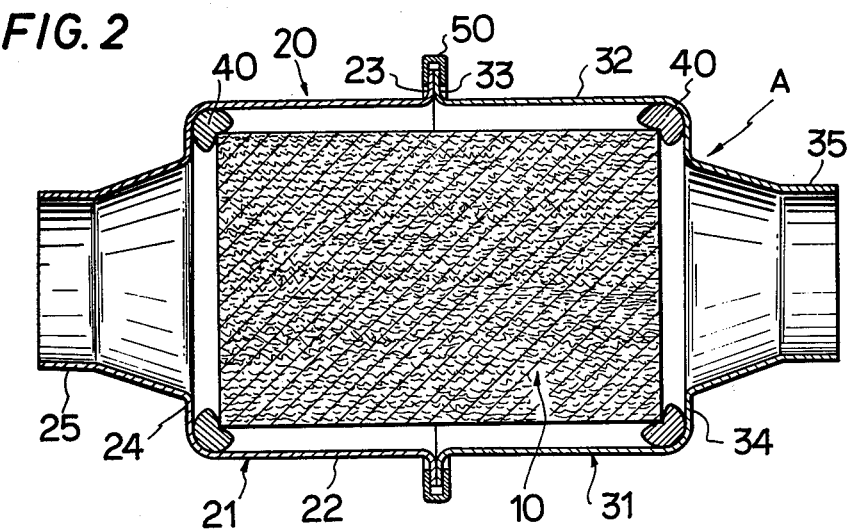
FIG. 2 is a view similar to FIG. 1 showing a modified embodiment of the invention.
Figure 4:
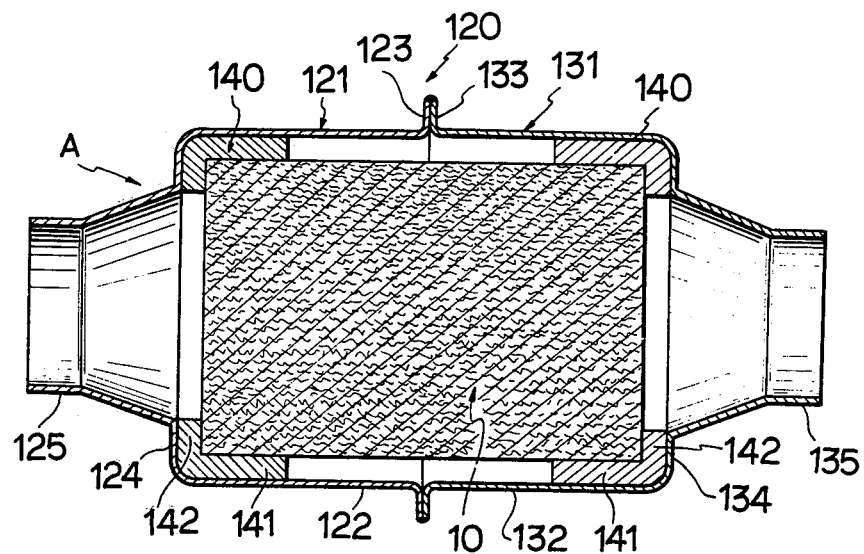
FIG. 4 is a vertically-sectioned side view of a catalyst converter according to a second embodiment of the present invention.

With reference to FIGS. 1, 2 and 4, there is shown a catalyst body 10 made truly circular or the like in cross-section. This catalyst body 10 is formed by depositing a catalyst metal on the surface of a honeycomb-shaped catalyst carrier made of ceramics, thus defining a catalyst body 10 having a plurality of passages which are parallel with each other in the axial direction.

FIG. 1 shows a first embodiment of the invention wherein a case 20 is formed of halves 21 and 31 divided in the axial direction and formed by press-shaping a heat-proof and anticorrosive steel plate material. The respective halves 21 and 31 are formed to be symmetrical with each other, and are provided respectively with cylindrical bodies 22 and 32 of a diameter substantially larger than the outside diameter of the catalyst body 10. Joining flanges 23 and 33 are formed integrally by being bent and raised vertically outwardly in the radial direction at the butted open ends of bodies 22 and 32 and have the portions forming the front and rear end surfaces of the case in the base parts, the rear parts being bent vertically toward the inner peripheries to continuously form ring-shaped end plate portions 24 and 34.

Tubular parts 25 and 35 which are funnel-shaped in the illustrated embodiment are integrally provided as extended continuously outwardly in the axial direction in the central parts of the end plate portions 24 and 34. The inside diameters on the end plate portions 24 and 34 sides of tubular parts 25 and 35 are set to be substantially smaller than of the bodies 22 and 32 and to be smaller than of the end surfaces of the catalyst body 10.

The above respective portions of the halves 21 and 31 are integrally shaped. The halves 21 and 31 are so fitted as to cover both end portions in the axial direction of the catalyst body 10 and are pressed toward each other. Prior to fitting them, elastic supporting rings 40 each made of a compressed molding of metal fibers are inserted respectively in the inner end corners of the bodies 22 and 32 and the end plate portions 24 and 34 of the halves 21 and 31. These elastic supporting rings 40 are made circular in cross-section in this embodiment. The halves 21 and 31 are pressed toward each other in the axial direction so that the outer peripheral end edges of both end portions in the axial direction of the catalyst body 10 may bite into the supporting rings 40 and may compress and deform them in the axial direction. The opposed surfaces of the flange portions 23 and 33 of the halves 21 and 31 are butted to each other as kept pressed in the axial direction and the butted end edges are welded to each other on the entire periphery to integrally combine the halves 21 and 31 with each other to thus form a catalyst converter A.

In this manner, the halves 21 and 31 will hold the catalyst body 10 as pressed in the axial direction through the supporting rings 40 which are elastic members. The supporting rings 40 will be deformed by the above-mentioned pressing, will protrude in the radial direction, and will bite into the end surface edge portions of the catalyst body 10 in the axial direction and radial direction.

A space S will be formed between the catalyst body 10 and the bodies 22 and 32 of the case 20. In consideration of keeping the catalyst body 10 warm, prevention of overheating of the case and quickly cooling and cracking the catalyst in case the outer plate is wet with water such as at the time of rainfall, it is desirable to fill the space S with an adiabatic material.

FIG. 2 shows a modified embodiment of the means of integrally combining the halves 21 and 31 with each other. In this embodiment, the butt-joined flange portions 23 and 33 are held as embraced with a ring-shaped clip 50 of a channel-shaped cross-section. Welding may be used together with it.

Figure 3:
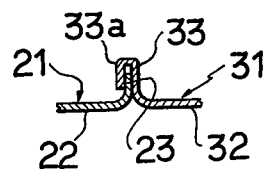
FIG. 3 is a view of a further modified embodiment showing only the combining parts.

FIG. 3 shows an embodiment wherein the flange portion 33 of one of the halves 21 and 31 is extended at 33a in the direction of the outside diameter and is bent and calked. Welding may be used together with it.

Figure 5:
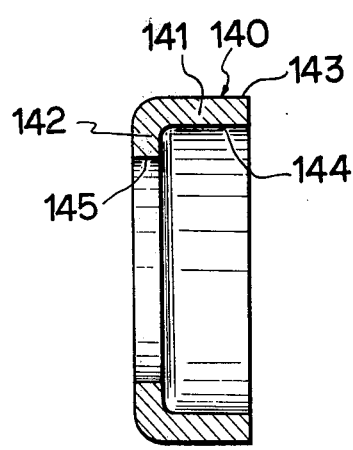
FIG. 5 is a vertically-sectioned side view of an elastic supporting ring used in the embodiment depicted in FIG. 4.
Figure 6:
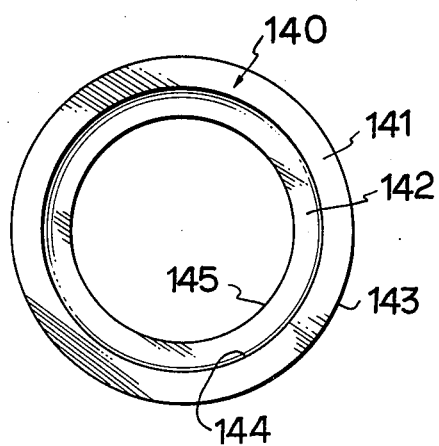
FIG. 6 is a view taken in the direction indicated by the arrow in FIG. 5.

FIGS. 4 to 6 show a second embodiment of the present invention. In this embodiment, in order to positively hold the catalyst body 10 with the case, the shape of the supporting ring and the pre-load in the supporting state are taken into consideration.

Similar to the above arrangement, a case 120 is formed of two divided members 121 and 131 in the axial direction and they are provided respectively with cylindrical bodies 122 and 132, flange portions 123 and 133, end plate portions 124 and 134 and tubular portions 125 and 135, and are formed of press-shaped steel plates.

Two supporting rings 140 to be used are symmetrical with each other, are made of compressed moldings of metal fibers and are formed to be ring-shaped of L-shaped cross section. The ring 140 is formed to be somewhat long in the axial direction in the tubular portion 141 and is provided in the base part of this portion 141 with a ring-shaped end edge portion 142 extended in the direction of the inside diameter as continued with the base part. As shown in FIGS. 4 and 5, the outer surfaces of tubular portion 141 and end edge portion 142 of rings 140 are continued through a curved surface in a rounded shape. The outside diameter 143 of this tubular portion 141 is made larger than the inside diameter of the bodies 122 and 132 of the case halves and its inside diameter 144 is made a diameter closely fitting or somewhat smaller than the outside diameter of the catalyst body 10. The inside diameter 145 of the ring-shaped end edge portion 142 is made the same as or somewhat larger than the inside diameter of the end plate portions of the case halves, i.e., the inside diameter of the base parts of the tubular portions 125 and 135, and has a proper thickness in the axial direction.

In assembling the component parts 10, 121, 131 and 140, first the L-shaped supporting rings 140 are fitted to both end surfaces in the axial direction of the catalyst body 10. The respective tubular portions 141 are fitted to the outer peripheries of both end portions of the catalyst body 10 and are pressed in the axial direction toward each other. Thereby, the tubular portions 141 will be fitted to the outer peripheries of both end portions of the catalyst body 10, and the inner end surfaces of the respective end edge portions 142 will contact the portions near the outer peripheries of both end surfaces of the catalyst body 10. As a result, the central portion of the catalyst body 10, with the exception of the outer peripheral portions of the end surfaces, will be exposed.

Next, rings 140, which are fitted in advance to both ends of catalyst body 10 as set forth hereinabove, are forcibly pressed and fitted, while fitted to body 10, into the case halves 122, 132 through the open ends thereof under a predetermined load in the axial direction.

At the time of pressing in and fitting the halves 121 and 131, as the flange portions 123 and 133 are formed as bent and raised in the radial direction at the open inserting ends, even if the rings 140 are of a diameter larger than the inside diameter of the open portions of the bodies 122 and 132, the rings 140 will be able to be pressed in and fitted so as to be pulled in without being caught. In such case, the end edge portions 141 will be caught on the peripheral side parts of both end surfaces of the catalyst body 10 and will therefore function as stoppers. Also, because the outer surfaces of tubular portion 141 and end portion 142 of rings 140 are continued through a curved surface in a rounded shape, rings 140 will be fitted into the case halves while being fitted in the catalyst body, even if the rings are of a diameter larger than the inside diameter of the open end of the case halves. The outside diameter portions 143 of the tubular portions 141 of the rings 140 will be compressed and deformed inwardly in the radial direction to elevate the elastic function by the advance of the bodies 122 and 132 toward each other in the axial direction. By the further advance in the axial direction of the bodies 122 and 132, at last, the flange portions 123 and 133 will approach each other. When the bodies 122 and 132 are pressed in so that the opposed ends of the flange portions 123 and 133 contact each other, the end edge portions 142 of the rings 140 will be held by the end plate portions 124 and 134 of the halves 122 and 132 and both end surfaces of the catalyst body 10, and will be compressed and deformed to elevate the elastic function. The outer peripheral end edge portions of the flange portions 123 and 133 in contact with each other as pressed in the axial direction under a load are welded on the entire periphery to make the halves 121 and 131 integral with each other. Thus, such case 120 as is shown in FIG. 4 is formed to obtain a catalyst converter A fitted with the catalyst body 10 within.

Because the supporting rings 140 are pressed and held within the case under a load, the portions near the outer peripheries of both end surfaces and all the peripheries of both end portions of the outer periphery of the catalyst body 10 will be supported by the compressed and deformed supporting rings 140 under the elastic action of a pre-load. In this connection, it should be noted with regard to supporting rings 140 that the axial length of tubular portion 141 is so set as to be sufficiently longer than a radial length of end edge portion 142 (as shown in FIG. 4) so as to ensure against crushing of catalyst body 10.

The following conditions are preferable for the pre-load as supporting the catalyst body 10 supported within the case 120.

Figure 7:
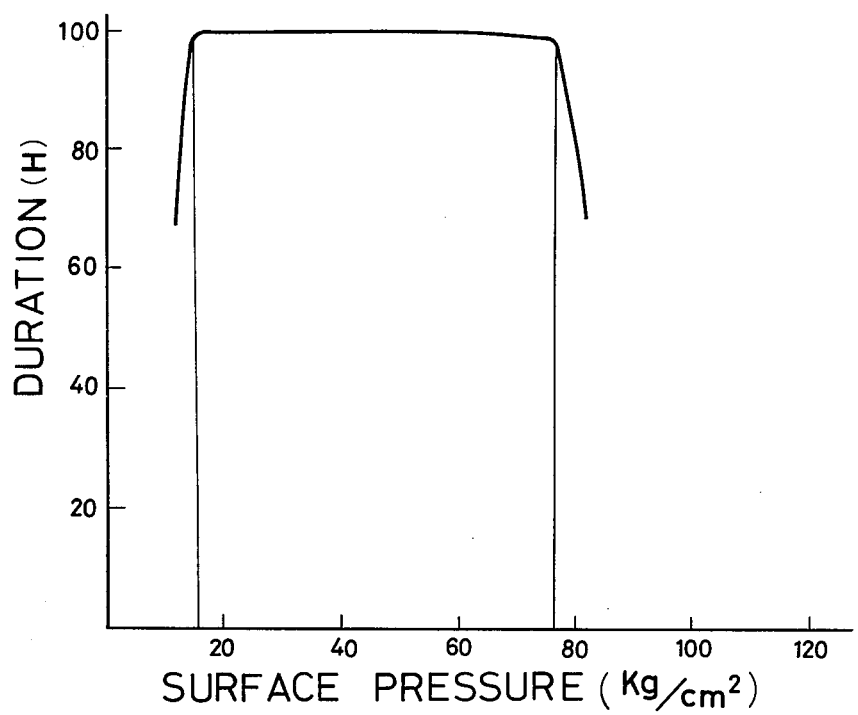
FIG. 7 is a graph showing the relations between the surface pressure of supporting rings and the duration in supporting a catalyst body.

FIG. 7 is a graph explaining the pre-load in the supporting state, the abscissa indicates the surface pressure in $kg/cm^2$ of the elastic metal ring 140 and the ordinate indicates the duration of the catalyst converter. As evident from the curve in this graph, with a surface pressure of a load below 15 $kg/cm^2$, the elastic function of the elastic metal ring will not be sufficiently obtained. Due to the difference in the thermal expansion between the ceramics and case while hot, the pre-load will reduce and the catalyst body will stagger with vibrations or the like and, as a result, no sufficient durability will be obtained. With 15 $kg/cm^2$, a duration longer than 100 hours will be shown. After a duration longer than 100 hours is shown with 15 $kg/cm^2$, under a higher pressure, the same duration will be obtained. When the pressure of 75 $kg/cm^2$ is exceeded, the duration will be extremely reduced. This is because the surface pressure of the elastic metal body will become so high that the honeycomb-shaped catalyst carrier made of ceramics will be locally broken. Therefore, a pre-load below 15 $kg/cm^2$ is not desirable due to the reduction of the duration and a pre-load of above 75 $kg/cm^2$ is also not desirable due to the local break of the carrier. The range of 15 to 75 $kg/cm^2$ in which the longest duration is obtained is desirable.

When the L-shaped elastic metal bodies are inserted into the case at the front and rear ends of the catalyst carrier and are assembled under a load in the axial direction as in the above, the catalyst body will be elastically supported under a pre-load. Therefore, the difference in the thermal expansion between the catalyst body made of ceramics and the metal case while hot and cold will be absorbed by the elastic metal bodies and, even while hot, no staggering will be caused with the case, and the catalyst body will be held effectively and positively. When the pre-load is made 15 to 75 $kg/cm^2$, as mentioned above, the catalyst converter will be able to function with stability and effectiveness for a long period of time. Thus, the practicability of the catalyst converter, which is fragile and weak in resisting vibrations and shocks, is greatly elevated.

Figure 8:
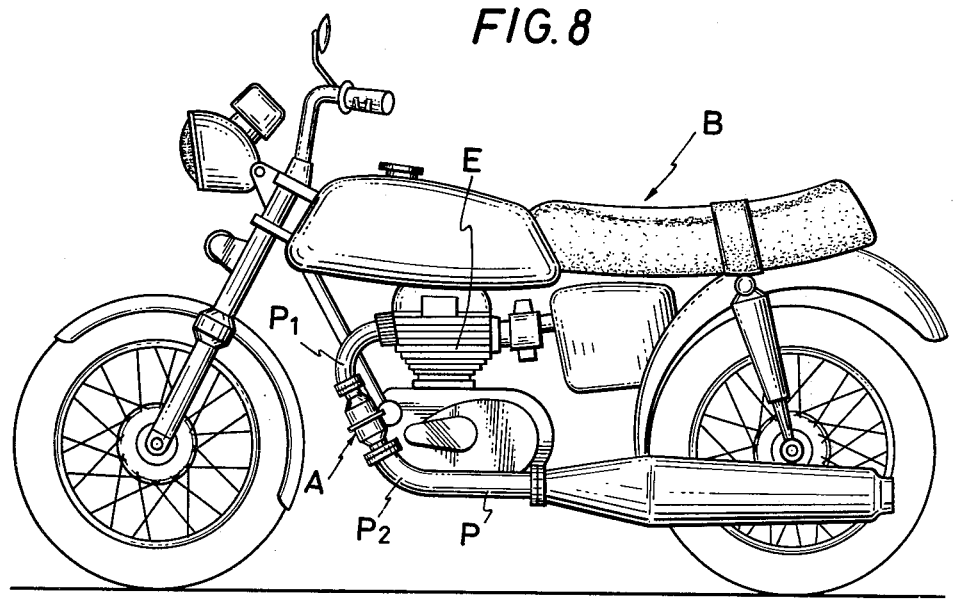
FIG. 8 is a schematic explanatory view of a motorcycle provided with a catalyst converter.

The catalyst converter A formed as in the above is fitted to a motorcycle B as is shown, for example, in FIG. 8. An exhaust pipe P led out of an exhaust passage of an engine E is divided into two parts $P_1$ and $P_2$ near the engine, one of the tubular portions at both ends of the case of the catalyst converter A is connected with the part $P_1$ on the engine side and the other is connected with the other part $P_2$ so that the catalyst converter A may be connected with the exhaust pipe P and exhaust gases may be removed by the catalyst body fitted within the exhaust system.

The present invention has been explained in detail in the above, and is believed to have been able to be well understood therefrom.

We claim:

1. A catalyst converter for cleaning the exhaust of a vehicle, comprising:
    a case;
    said case being divided at its substantially central portion thereof in the axial direction to form two case halves;
    a catalyst-carrying ceramic element provided with honeycomb passages;
    support rings formed entirely of compressed metallic fibers including netted steel wires;
    each said support ring having an L-shaped cross-section;
    support portions on said case halves, said support portions and said support rings applying an axial compression of 15 to 75 KG/cm$^2$ to said catalyst-carrying ceramic element;
    said compressed metallic fiber support rings directly contacting both said ceramic element and said support portions, and holding said ceramic element between said rings while imparting compression to said ceramic element in radial and axial directions;
    said compressed metallic fiber support rings being directly fitted to the end surfaces in the axial direction of said ceramic element to be in direct contact with the radially-extending end surfaces and the outer periphery of said ceramic element to support said ceramic element within said case; and
    said support rings having an initial pre-assembled outside diameter which is larger than the inside diameter of said case halves such that said rings are forcibly pressed and fitted within said case halves.

2. A catalyst converter according to claim 1, wherein:
    each said case half is formed of a press-shaped steel plate, and includes a cylindrical body portion which extends in the axial direction from a butted open end to an outer free end of each said case half;
    said catalyst-carring ceramic element is provided with a plurality of passages which are parallel with each other in the axial direction;
    said support rings comprise a pair of substantially compressible support rings formed of pressed steel wire of annular shape; and
    each said support ring includes a tubular portion extended in the axial direction and an end edge portion extended in the radial direction, the axial length of said tubular portion being sufficiently longer than the radial length of said end edge portion to ensure against crushing of said catalyst-carrying ceramic element within said case.

3. A catalyst converter according to claim 2, wherein:
    the outer surfaces of said tubular portion and said end edge portion of said support rings are continued through a curved surface of each said support ring.

4. A catalyst converter according to claim 1, wherein:
    said case halves comprise a pair of symmetrically divided case halves, said case halves each including a tubular end part formed integrally with a body part;
    each said body part of said case halves has a diameter larger than the diameter of said tubular end parts, and is opened at the end edge thereof;
    said tubular end parts of said case halves are connected with an exhaust passage such that one of said tubular end parts defines an inlet of said catalyst converter and the other of said tubular end parts defines an outlet of said catalyst converter;
    said support rings comprise a pair of elastic support rings made of compressed moldings of said metallic fibers; and
    said case halves are integrally combined with each other in butted joining parts while pressed toward each other in the axial direction from both ends in the axial direction of said catalyst-carring ceramic element.

5. A catalyst converter according to claim 4, wherein:
    flange portions extended outwardly in the radial direction are provided in the respective joining end parts of said case halves, and are butted and joined with each other to be integrally combined with each other.

6. A catalyst converter according to claim 5, wherein:
    said flange portions are combined with each other by means of a clip which is channel-shaped in cross-section.

7. A catalyst converter according to claim 5, wherein:
    one of said flange portions is extended outwardly in the radial direction, and is bent and calked to be combined with the other of said flange portions.

8. A catalyst converter according to claim 1, wherein:
    said case halves have a diameter which is larger than the outside diameter of said catalyst-carrying ceramic element;
    said case halves are formed from metal plates having symmetrical cross-sections and substantially symmetrical shapes;
    each said elastic support ring is made of a compressed molding of metal wires;
    said elastic support rings are applied to cover the peripheral sides of said catalyst-carrying ceramic element at both ends in the axial direction of said catalyst-carrying ceramic element to be in contact with the end surfaces and the outer periphery of said catalyst-carrying ceramic element;
    said case halves are fitted to said catalyst-carrying ceramic element from both end parts and are pressed in toward each other while compressing the outside diameter of said elastic support rings; and
    said case halves are integrally combined with each other by welding.

* * * * *